United States Patent
Kim et al.

(10) Patent No.: US 12,041,336 B2
(45) Date of Patent: Jul. 16, 2024

(54) SENSOR ASSEMBLY INCLUDING LIGHT CONTROL MEMBER AND ELECTRONIC DEVICE INCLUDING THE SAME

(71) Applicant: Samsung Electronics Co., Ltd., Suwon-si (KR)

(72) Inventors: Hyunwoo Kim, Suwon-si (KR); Hyunseok Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 17/961,131

(22) Filed: Oct. 6, 2022

(65) Prior Publication Data
US 2023/0209173 A1 Jun. 29, 2023

Related U.S. Application Data

(63) Continuation of application No. PCT/KR2022/013777, filed on Sep. 15, 2022.

(30) Foreign Application Priority Data

Dec. 24, 2021 (KR) .................. 10-2021-0187380

(51) Int. Cl.
*H04N 23/61* (2023.01)
*H04N 23/51* (2023.01)
(Continued)

(52) U.S. Cl.
CPC ............ *H04N 23/61* (2023.01); *H04N 23/51* (2023.01); *H04N 23/671* (2023.01); *H04N 23/957* (2023.01)

(58) Field of Classification Search
CPC .......... G01B 11/24; G01B 5/20; H04N 23/13; H04N 23/51; H04N 23/61; H04N 23/662; H04N 23/671; H04N 23/957
See application file for complete search history.

(56) References Cited

U.S. PATENT DOCUMENTS

2018/0109710 A1 4/2018 Lee et al.
2019/0363118 A1* 11/2019 Berkovich ............ H04N 25/44
(Continued)

FOREIGN PATENT DOCUMENTS

GB 2351554 A 1/2001
JP 06-176137 A 6/1994
(Continued)

OTHER PUBLICATIONS

Elliott Donlon et al., GelSlim: A High-Resolution, Compact, Robust, and Calibrated Tactile-sensing Finger, arXiv:1803.00628v2 [cs.RO], May 15, 2018.
(Continued)

*Primary Examiner* — Amy R Hsu
(74) *Attorney, Agent, or Firm* — Jefferson IP Law, LLP

(57) ABSTRACT

A sensor assembly is provided. The sensor assembly includes a housing including an opening, a circuit substrate disposed in the inside of the housing, an image sensor electrically connected to the circuit substrate, a light-control member configured to change light transmittance from a light transmission state capable of transmitting external light to a light reflection state capable of reflecting light according to application of power, and a contact member disposed adjacent to the opening and allowing light to pass therethrough. wherein, when viewed from a lateral side, the light-control member is disposed such that a longitudinal extension line of the light-control member and a longitudinal extension line of the contact member may form a predetermined angle therebetween, when the light-control member is in the light transmission state, the image sensor is disposed to obtain an image over the light-control member, and when the light-control member is in the light reflection state, the image sensor is disposed to receive light reflected by the
(Continued)

light-control member and light directly incident through the contact member.

20 Claims, 7 Drawing Sheets

(51) Int. Cl.
 *H04N 23/67* (2023.01)
 *H04N 23/957* (2023.01)

(56) References Cited

U.S. PATENT DOCUMENTS

| | | | |
|---|---|---|---|
| 2020/0292465 A1* | 9/2020 | Konno | G01B 11/24 |
| 2021/0072101 A1 | 3/2021 | Kato et al. | |
| 2021/0146532 A1* | 5/2021 | Rodriguez Garcia | B25J 9/0087 |
| 2021/0263294 A1* | 8/2021 | Chou | G01N 21/255 |
| 2022/0252384 A1* | 8/2022 | Liu | G02B 27/1006 |

FOREIGN PATENT DOCUMENTS

| | | |
|---|---|---|
| JP | 2000-288973 A | 10/2000 |
| JP | 2020-125926 A | 8/2020 |
| JP | 2021-535373 A | 12/2021 |
| KR | 10-2009-0079626 A | 7/2009 |
| KR | 10-2017-0142813 A | 12/2017 |
| KR | 10-2018-0042718 A | 4/2018 |
| KR | 10-2019-0083774 A | 7/2019 |
| KR | 10-2107998 B1 | 5/2020 |
| WO | 2021-197667 A1 | 10/2021 |

OTHER PUBLICATIONS

International Search Report dated Dec. 20, 2022, issued in International Application No. PCT/KR2022/013777.

* cited by examiner

SENSOR ASSEMBLY INCLUDING LIGHT CONTROL MEMBER AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/013777, filed on Sep. 15, 2022, which is based on and claims the benefit of a Korean patent application number 10-2021-0187380, filed on Dec. 24, 2021, in the Korean Intellectual Property Office, the disclosure of which is incorporated by reference herein in its entirety.

TECHNICAL FIELD

The disclosure relates to a sensor assembly. More particularly, the disclosure relates to a sensor assembly including a light-control material.

BACKGROUND ART

A tactile sensor refers to a sensor for determining the characteristics of an object surface. The tactile sensor may also be used to measure the softness or hardness of an object. Tactile sensors may be mounted and used for various electronic devices (for example, industrial robots), and have been increasingly demanded in various industrial fields. Tactile sensors commonly acquire light reflected on an object surface by using an image sensor (for example, complementary metal oxide semiconductor (CMOS)).

In connection with using a tactile sensor, various pieces of information regarding the target to be analyzed, such as object surface information, information regarding the distance from the object, and object identification information, may be required together. In such a case, the tactile sensor may be used in tandem with other sensors.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

According to an embodiment of the disclosure, a sensor assembly is provided. The sensor assembly includes a housing including an opening, a circuit board disposed in the housing, an image sensor electrically connected to the circuit board, a light-control member configured to change light transmittance from a light transmission state in which external light can be transmitted to a light reflection state in which light can be reflected according to application of power and a contact member disposed adjacent to the opening such that light can pass therethrough. Wherein, when viewed from a lateral side, the light-control member is disposed such that a longitudinal extension line of the light-control member and a longitudinal extension line of the contact member form a predetermined angle therebetween. Wherein, when the light-control member is in the light transmission state, the image sensor is disposed to obtain image data behind the light-control member. Wherein, when the light-control member is in an on-state, the image sensor is disposed to receive light reflected by the light-control member and light directly incident through the contact member.

According to an embodiment of the disclosure, a method for controlling a sensor assembly is provided. The method includes preparing a sensor assembly including a housing including an opening, a circuit substrate disposed inside the housing, an image sensor electrically connected to the circuit substrate, a light-control member configured to be changed from a light transmission state in which external light can be transmitted to a light reflection state in which light can be reflected according to application of power, and a contact member disposed adjacent to the opening such that light can pass therethrough, the light-control member being disposed, when viewed from a lateral side, such that a longitudinal extension line of the light-control member and a longitudinal extension line of the contact member form a predetermined angle therebetween, adjusting the light-control member to be in the light transmission state, identifying an external object existing over the light-control member, adjusting the light-control member to be in the light reflection state, obtaining information on a distance between the external object and the sensor assembly, and obtaining surface tactile information of the external object.

According to an embodiment of the disclosure, an electronic device is provided. The electronic device includes a sensor assembly, and a circuit board electrically connected to the sensor assembly. Wherein the sensor assembly includes a housing including an opening, an image sensor, a light-control member configured to change light transmittance from a light transmission state in which external light can be transmitted to a light reflection state in which light can be reflected according to application of power and a contact member disposed adjacent to the opening such that light can pass therethrough. Wherein, when viewed from a lateral side, the light-control member is disposed such that a longitudinal extension line of the light-control member and a longitudinal extension line of the contact member form a predetermined angle therebetween, wherein, when the light-control member is in the light transmission state, the image sensor is disposed to obtain image data behind the light-control member, and wherein, when the light-control member is in an on-state, the image sensor is disposed to receive light reflected by the light-control member and light directly incident through the contact member.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

Figure 1:
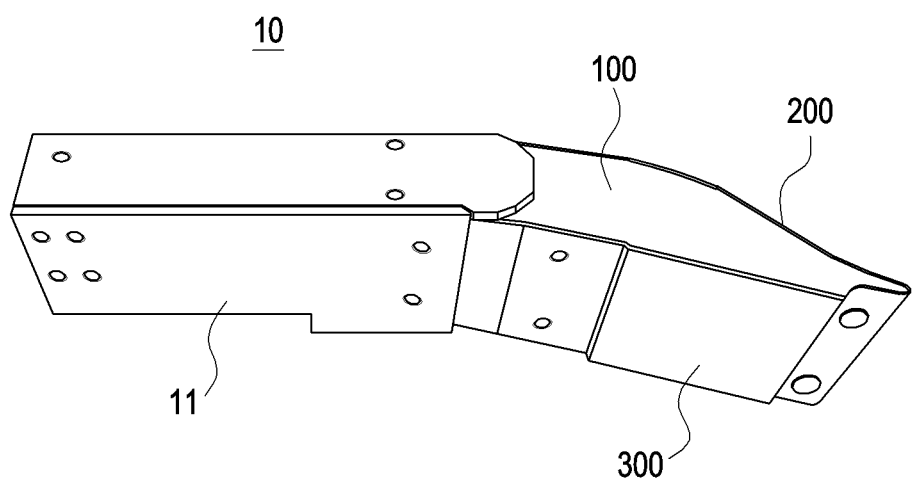
FIG. 1 is a schematic view illustrating implementation of a sensor assembly according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

FIG. 1 is a schematic view illustrating an example of implementation of a sensor assembly according to an embodiment of the disclosure.

Figure 2:
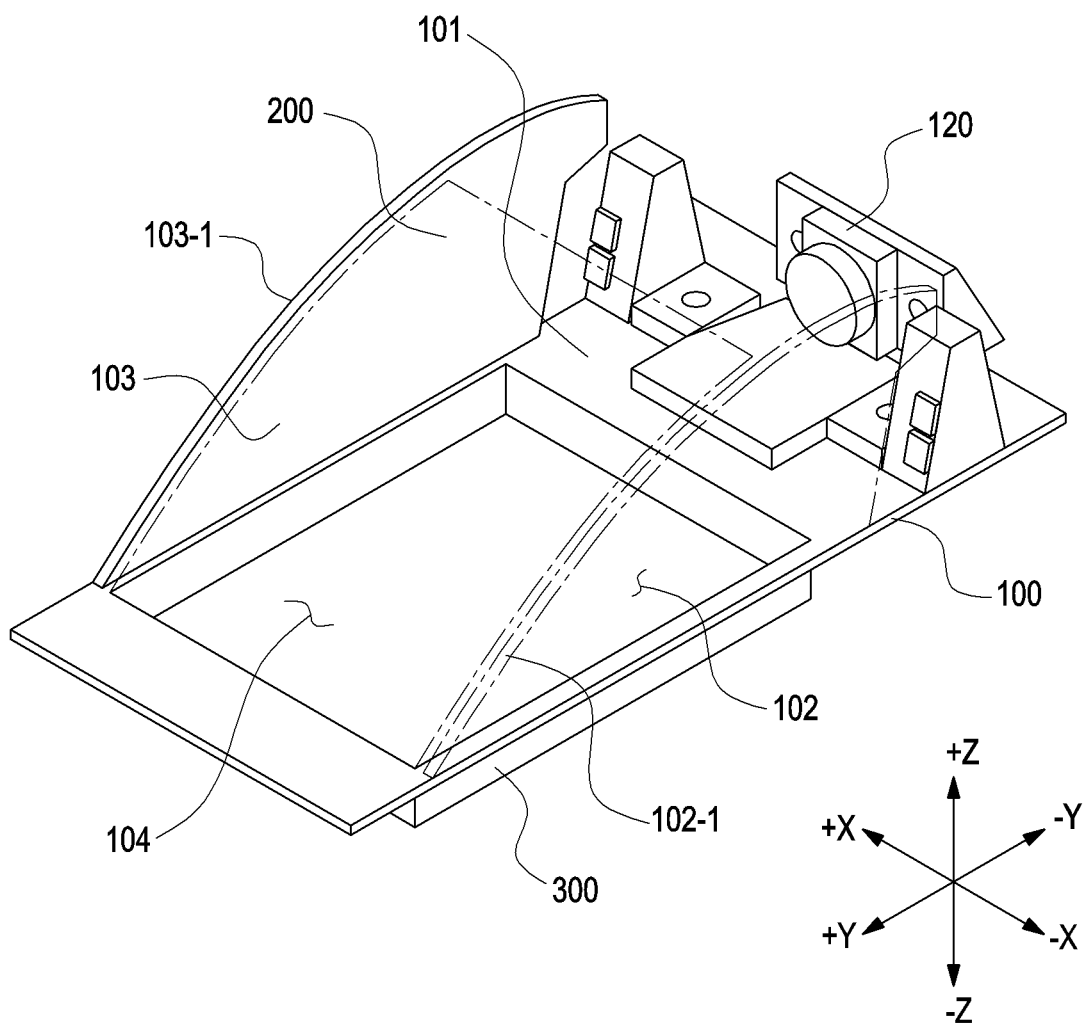
FIG. 2 is a view illustrating an internal structure of a sensor assembly according to an embodiment of the disclosure.

FIG. 2 is a view illustrating an internal structure of a sensor assembly according to an embodiment of the disclosure.

Referring to FIGS. 1 and 2, the sensor assembly 10 may include all of or some of a housing 100, an image sensor 120, a light-control member 200, a contact member 300, and a connector part 11.

Figure 3:
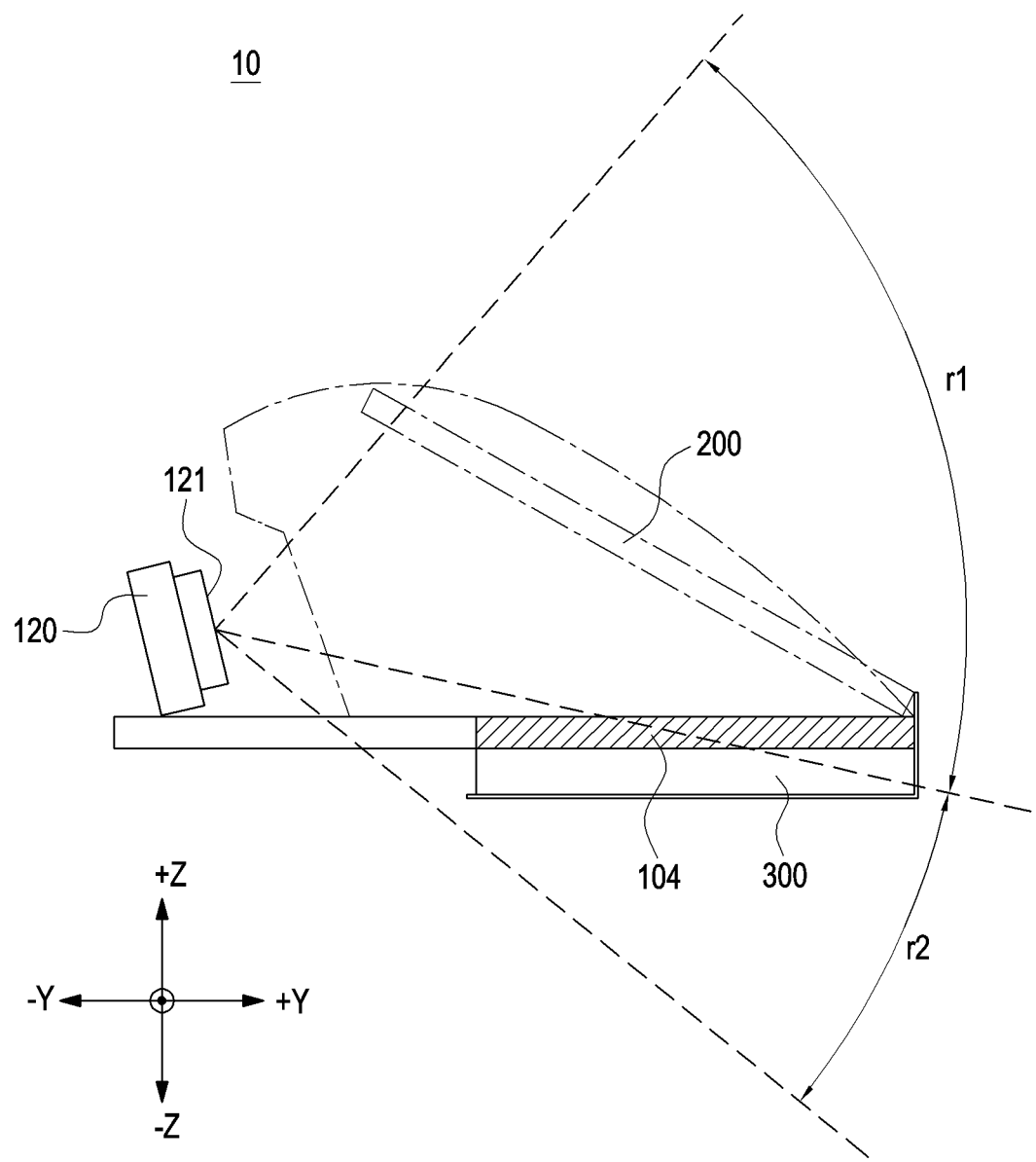
FIG. 3 is a view illustrating a view-angle range of a sensor assembly according to an embodiment of the disclosure.

According to various embodiments, the sensor assembly 10 may identify an object (e.g., the object 1 in FIG. 3) near the sensor assembly 10, determine a distance to an object (e.g., the object 1 in FIG. 3), and obtain tactile information of an object (e.g., the object 1 in FIG. 3).

According to an embodiment, the sensor assembly 10 may be electrically and/or physically connected to an external device (e.g., an industrial robot) through the connector part 11. The sensor assembly 10 may be controlled by the external electronic device (e.g., an industrial robot) connected thereto. For example, movement of the sensor assembly 10 or an internal operation of the sensor assembly 10 may be controlled by an electrical signal of the external electronic device connected thereto. For example, the sensor assembly 10 may be mounted to a hand of an industrial robot to allow to obtain tactile information when the industrial robot grabs an object. In addition thereto, by using the sensor assembly 10, the industrial robot may identify an object outside the sensor assembly 10, determine a distance between the object and the sensor assembly 10 (e.g., a finger of the industrial robot), and obtain tactile information of the object by grabbing the object.

According to an embodiment, the sensor assembly 10 may be operated by including a power source inside thereof or being connected to an external power source. In addition, as will be described below, a circuit board (not shown) including a processor for adjusting light transmittance of the light-control member 200. The circuit board may be electrically connected to the image sensor 120 and/or the light-control member 200. In addition, the processor may be programmed to process image information obtained by the image sensor (e.g., the image sensor 120 in FIG. 3). In an embodiment, the sensor assembly 10 may be connected to a power source of an external electronic device or a processor of an external electronic device.

According to various embodiments, the image sensor 120 may be a digital camera, that is a camera for outputting image data as an electrical signal. For example, the image sensor may be a CCD camera. However, the image sensor 120 of the disclosure is not limited to a CCD camera and, for example, a digital camera using a C-MOS type image sensor may be used therefor.

According to various embodiments, the housing 100 may form an exterior of the sensor assembly 10. The housing 100 may include a first surface 101, a second surface 102, and a third surface 103. According to an embodiment, the first surface 101 may mean the bottom surface (a surface facing the −Z-axis direction) of the housing 100. In addition, the second surface 102 and the third surface 103 may mean opposite lateral surfaces (opposite lateral surfaces with respect to the X-axis direction) of the housing 100. For example, the second surface 102 and the third surface 103 may be arranged to face each other.

According to various embodiments, an outer peripheral area 102-1 of the second surface 102 and the first surface 101 may be arranged to have a predetermined angle therebetween. According to an embodiment, the second surface 102 may be formed to have a width becoming narrower toward a first side (+y-axis direction) of the housing 100. For another example, the second surface 102 may be expressed to have a tapered shape. According to an embodiment, the outer peripheral area 102-1 of the second surface 102 may have a gradually curved shape.

According to an embodiment, the second surface 102 and the third surface 103 may be symmetrical to each other. A description of the second surface 102 may be identically or similarly applied to the third surface 103. For example, the description of the outer peripheral area 102-1 of the second surface 102 may be applied to an outer peripheral area 103-1 of the third surface 103.

According to various embodiments, the light-control member 200 may be disposed to form at least one surface of the housing 100. For example, the light-control member 200 may be disposed perpendicular to the second surface 102 and the third surface 103 and disposed to connect the second surface 102 and the third surface 103. According to an embodiment, the light-control member 200 may be disposed between the second surface 102 and the third surface 103. For example, the light-control member 200 may be disposed to cover an inner space of the housing formed between the second surface 102 and the third surface 103. According to an embodiment, the light-control member 200 may be disposed to have a predetermined angle with the first surface 101. As will be described below, as the light-control member 200 has a predetermined angle with the first surface 101, light incident through an opening 104 may be reflected from the light-control member 200 and incident to the image sensor 120. As such, the sensor assembly 10 according to various embodiments may achieve a stereo camera effect.

According to various embodiments, the light-control member 200 may be formed of a material that may change light transmittance. According to an embodiment, the light-control member 200 may be changed in reflexibility according to application of power. For example, the light-control member 200 may allow light to pass therethrough when power is applied and light from the outside may be incident to the inside of the housing 100. For another example, the light-control member 200 may reflect light when power is cut off. For another example, the light transmittance of the light-control member 200 may be controlled by a processor (not shown) included in the sensor assembly 10 or a processor included in an external electronic device connected thereto.

According to various embodiments, the image sensor 120 may be disposed to face a first side (+y-axis direction) inside the housing 100. According to an embodiment, the image sensor 120 may be disposed to receive light incident through the light-control member 200. For another example, the image sensor 120 may be disposed to receive light incident through the opening 104. For another example, the image sensor 120 may be disposed to receive both light incident through the opening 104 and reflected from the light-control member 200 and light incident through the opening 104. This will be described later.

According to an embodiment, the image sensor 120 may be various camera modules, but is not limited thereto. It will be understood that various configurations capable of receiving and detecting light may be employed as long as the idea of the disclosure may be achieved.

According to various embodiments, the first surface 101 may include the opening 104. Light may be incident through the opening 104 and the image sensor 120 may receive the light.

According to various embodiments, the contact member 300 may be disposed on a bottom (−Z-axis direction) of the first surface 101. For example, the contact member 300 may be disposed to cover the opening 104. According to an embodiment, the contact member 300 may be formed of a light-transmitting and elastic material. For example, the sensor assembly 10 may receive light incident through the contact member 300 and determine a distance between an object (e.g., the object 1 in FIG. 3) and the sensor assembly 10. The contact member 300 may be formed of an elastic material. For example, the sensor assembly 10 may come in contact with an object (e.g., the object 1 in FIG. 3) through the contact member 300 and obtain tactile information of the object. According to various embodiments, the contact member 300 may be formed of an optically transparent elastic body (e.g., a gel). For example, the contact member 300 may be formed of a silicone resin such as silicone rubber, formed of another type of rubber or elastomer, and manufactured using other optically transparent materials, as well. In another embodiment, the contact member 300 may include a translucent material.

FIG. 3 is a view illustrating a view-angle range of a sensor assembly according to an embodiment of the disclosure.

Referring to FIG. 3, the image sensor 120 may be disposed to receive light from the opening 104 and the light-control member 200. The description for FIG. 1 may be applied to the image sensor 120, the housing 100, and the light-control member 200 in FIG. 3.

According to various embodiments, the view-angle range Rt may be adjusted according to a disposition angle of the image sensor 120. For example, a line extending vertically from the center of a sensing surface 121 of the image sensor 120 may correspond to the center line of the view-angle range Rt. According to an embodiment, the image sensor 120 may be disposed such that the light-control member 200 and the opening 104 are included in the view-angle range Rt.

According to various embodiments, the view-angle range Rt of the image sensor 120 may include a first view-angle range R1 and a second view-angle range R2. For example, the first view-angle range R1 may mean a view-angle range of the image sensor 120 corresponding to the light-control member 200, and the second view-angle range R2 may mean a view-angle range of the image sensor 120 corresponding to the opening 104 or the contact member 300. As described above, the first view-angle range R1 and/or the second view-angle range R2 may be adjusted according to the disposition angle of the image sensor 120. For another example, the view-angle range Rt of the image sensor 120 may be expressed to be divided into the first view-angle range R1 for receiving light incident through the light-control member 200 and the second view-angle range R2 for receiving light incident through the opening 104.

According to an embodiment, as will be described below, the image sensor 120 may receive light incident through the light-control member 200 at the first view-angle range R1 and identify an object outside the sensor assembly 10. For another example, as will be described below, the image sensor 120 may receive light reflected through the light-control member 200 at the first view-angle range R1 and obtain tactile information on an object outside the sensor assembly 10 near the opening 104. For another example, as will be described below, the image sensor 120 may receive light incident through the opening 104 at the second view-angle range R2 and obtain tactile information on an object outside the sensor assembly 10 near the opening 104.

According to an embodiment, the first view-angle range R1 and the second view-angle range R2 may be identical to each other. However, such is not required, and the first view-angle range R1 and the second view-angle range R2 may be configured to have different ranges. For example, the image sensor 120 may be disposed such that the first view-angle range R1 becomes larger than the second view-angle range R2.

In various embodiments, the first view-angle range R1 and the second view-angle range R2 may be adjusted according to arrangement relationship between the image sensor 120 and at least a portion of the light-control member 200, the opening 104, and/or the contact member 300. According to an embodiment, the view angle of the image sensor 120 may be adjusted according to an area occupied by components (e.g., the light-control member 200, the opening 104, and/or the contact member 300) of the sensor assembly 10 with respect to a direction (e.g., a second axis (the z-axis)) perpendicular to a normal line (e.g., a first axis (the y-axis)) of the sensing surface 121. For example, the view-angle range corresponding to a component (e.g., the light-control member 200, the opening 104, or the contact member 300) occupying a relatively wider area with respect to a direction perpendicular to the normal line of the sensing surface 121 may be wider. For example, in case that the image sensor 120 is disposed such that the normal line of the sensing surface 121 extends parallel with or similar to the first direction (the y-axis), when the light-control member 200 is disposed to have a wider area compared to the opening 104 and the contact member 300 with respect to the second axis (the z-axis) perpendicular to the first axis (the y-axis), the first view-angle range R1 corresponding to the light-control member 200 may be wider than the second view-angle range R2 corresponding to the opening 104 and the contact member 300.

In a description below, obtaining information about an external object by the sensor assembly 10 according to an operation of the light-control member 200 will be described with reference to the drawings.

Figure 4:
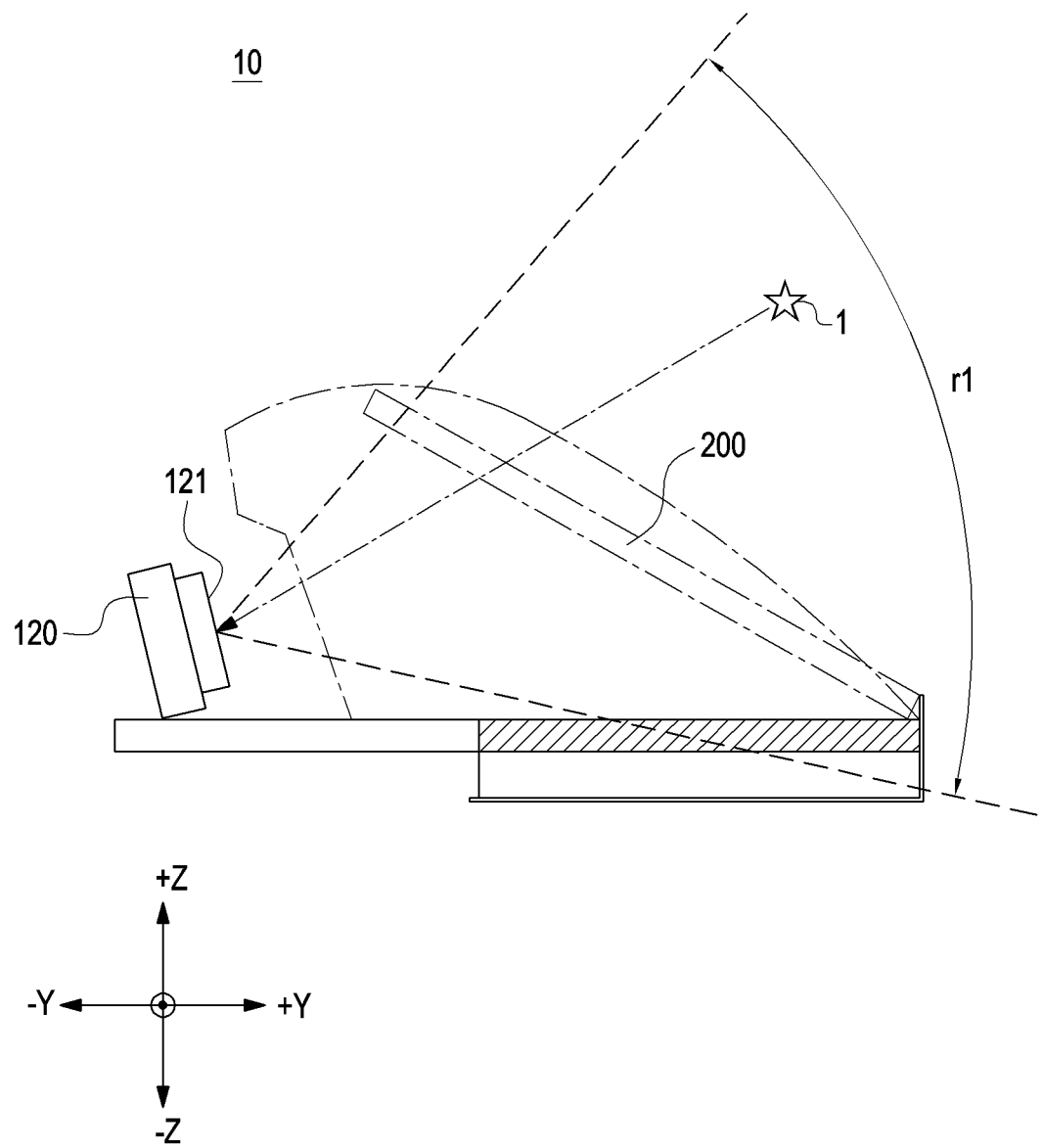
FIG. 4 is a view illustrating a process in which a sensor assembly detects an object, according to an embodiment of the disclosure.

FIG. 4 is a view illustrating a process in which a sensor assembly detects an object, according to an embodiment of the disclosure.

Referring to FIG. 4, the sensor assembly 10 may obtain visual information of an object 1. The description of the sensor assembly 10 in FIGS. 1 to 3 may be applied to the sensor assembly 10 in FIG. 4.

According to various embodiments, the sensor assembly 10 may identify the object 1 outside the sensor assembly 10. According to an embodiment, when the light-control member 200 is in a light transmission state, the light-control member 200 may allow light reflected from the object 1 to be transmitted into the inside of the sensor assembly 10. The image sensor 120 may receive light transmitted from the light-control member 200 and obtain visual information related to the object 1 outside of the sensor assembly 10. For example, the visual information may include shape information and color (RGB) information of the object 1. According to an embodiment, the image sensor 120 may obtain visual information of the object 1 existing in an external area of the sensor assembly 10, which corresponds to the first view-angle range R1.

According to various embodiments, the sensor assembly 10 may obtain tactile information of an object 2 when the light-control member 200 is in the light transmission state. An operation of the sensor assembly 10 obtaining tactile information of an external object may be applied identically when the light-control member 200 is in the light transmission state or in the light reflection state, and thus will be described with reference to FIG. 5.

Figure 5:
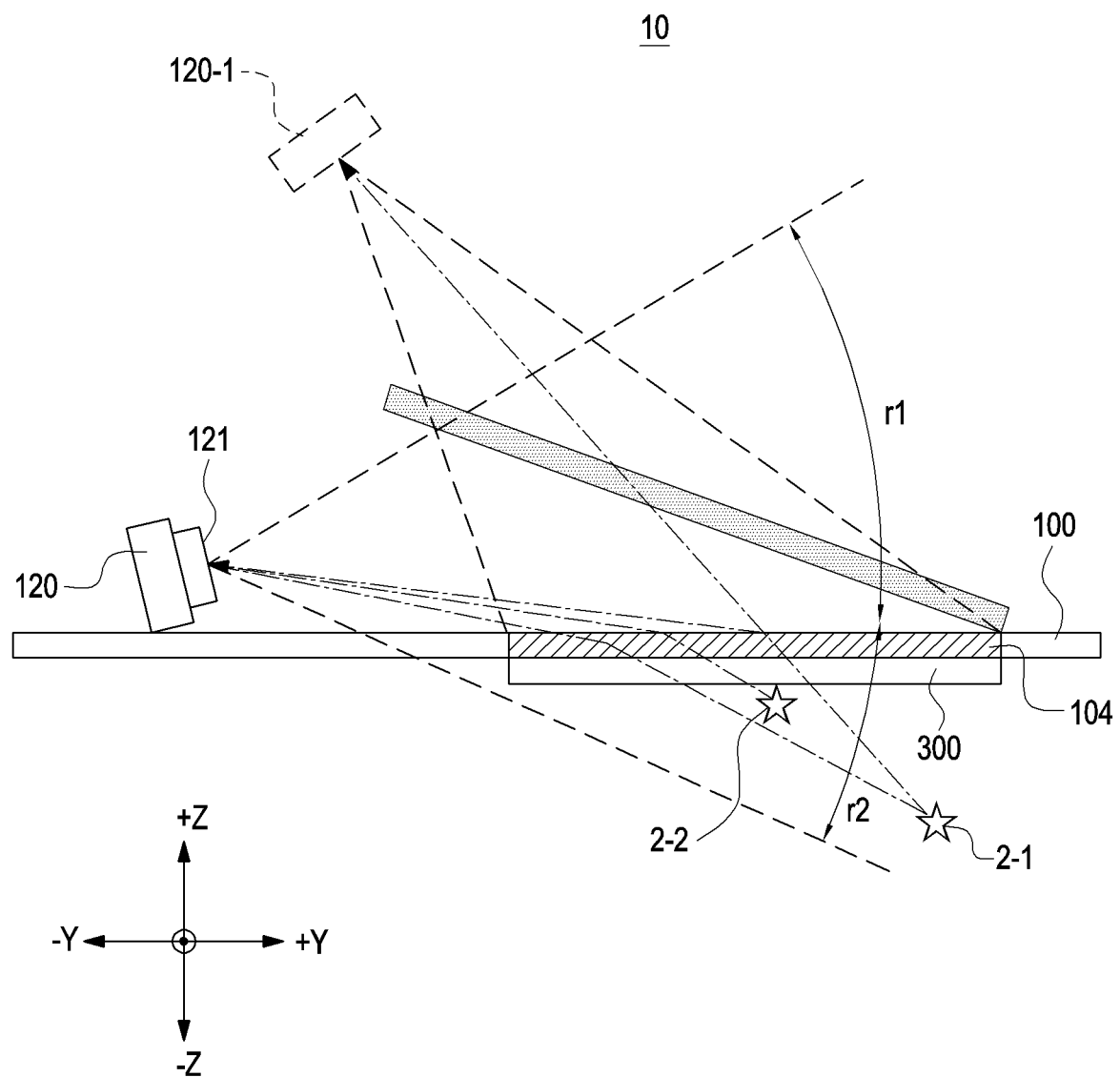
FIG. 5 is a view illustrating a distance recognition operation and a tactile sensing operation of a sensor assembly according to an embodiment of the disclosure.

FIG. 5 is a view illustrating a distance recognition operation and a tactile sensing operation of a sensor assembly according to an embodiment of the disclosure.

Referring to FIG. 5, the sensor assembly 10 may obtain tactile information of an external object in contact with the sensor assembly 10 and/or information on a distance between the sensor assembly 10 and the external object. In describing the embodiment of FIG. 5, the contents of FIGS. 1 to 4 may be applied thereto. The configuration of the sensor assembly 10 in FIG. 5 may be the same as or similar to the configuration of the sensor assembly 10 in FIGS. 1 to 4.

According to various embodiments, the sensor assembly 10 may obtain information of a distance between the sensor assembly 10 and an object 2-1 outside the sensor assembly 10. According to an embodiment, light having been reflected from the object 2-1 may be incident to the inside of the housing 100 through the contact member 300 and/or the opening 104. A portion of the light incident to the inside of the housing 100 may be directly transferred to the image sensor 120 and the remaining portion may be reflected from the light-control member 200 and transferred to the image sensor 120. For example, the operation of the sensor assembly 10 obtaining distance information of the object 2-1 may be performed when the light-control member 200 is in the light reflection state.

According to an embodiment, the image sensor 120 may directly receive light incident through the opening 104 and/or the contact member 300 through the second view-angle range R2. In addition, the image sensor 120 may receive light reflected from the light-control member 200 through the first view-angle range R1. The effect of adding a virtual image sensor 120-1 may be achieved by receiving the reflected light by the image sensor 120 through the light-control member 200. For example, the image sensor 120 may be expressed to be divided into a first image sensor 120 for receiving light at the first view-angle range r1 and a second image sensor 120-1 for receiving light at the second view-angle range R2. For example, the sensor assembly 10 may be implemented as a stereo camera using one image sensor 120, which is divided into a first image sensor (e.g., the real image sensor 120) for obtaining image information related to light received at the first view-angle range R1 and a second image sensor (e.g., a virtual image sensor 120-1) for obtaining image information related to light received at the second view-angle range R2. According to an embodiment, a processor (not shown) connected to the image sensor may obtain information on a distance between the sensor assembly 10 and the object 2-1, based on image information related to the same object (e.g., the object 2-1), which is obtained by two different cameras (e.g., the image sensor 120 and the virtual image sensor 120-1) disposed at different positions.

According to various embodiments, the sensor assembly 10 may obtain tactile information of an object 2-2 in contact with at least a portion of the sensor assembly 10. According to an embodiment, the sensor assembly 10 may obtain tactile information of a surface of the object 2-2 in contact with contact member 300. According to an embodiment, the contact member 300 may include a pattern. For example, the pattern may mean a configuration which facilitates obtaining of tactile information of a surface of the object 2-2 by changing a path of light passing through the contact member 300 when the contact member 300 is brought in contact with the object 2-2 or pressed. For another example, the pattern may be formed of a material (e.g., an elastic body) that may be easily deformed. Alternatively, the pattern may be formed of the same material as the contact member 300. Independently or together with the contact member 300, the pattern may be changed in a shape in response to force applied to the pattern (or the contact member) upon coming in contact with an external object. According to an embodiment, when the object 2-2 comes in contact with the contact member 300, the path of light passing through the pattern is changed (according to a change of a shape of the pattern or the contact member 300) and the light is incident to the image sensor 120, and the processor (not shown) may analyze the light to obtain surface tactile information of the object 2-2. According to an embodiment, a light source (not shown) may be disposed near the contact member 300. For example, the light source may be a white light source but is not limited thereto. The light generated from the light source may be incident to the inside of the contact member 300. Thereby, the surface information obtaining performance of the contact member 300 with respect to the object 2-2 may be improved.

Figure 6:
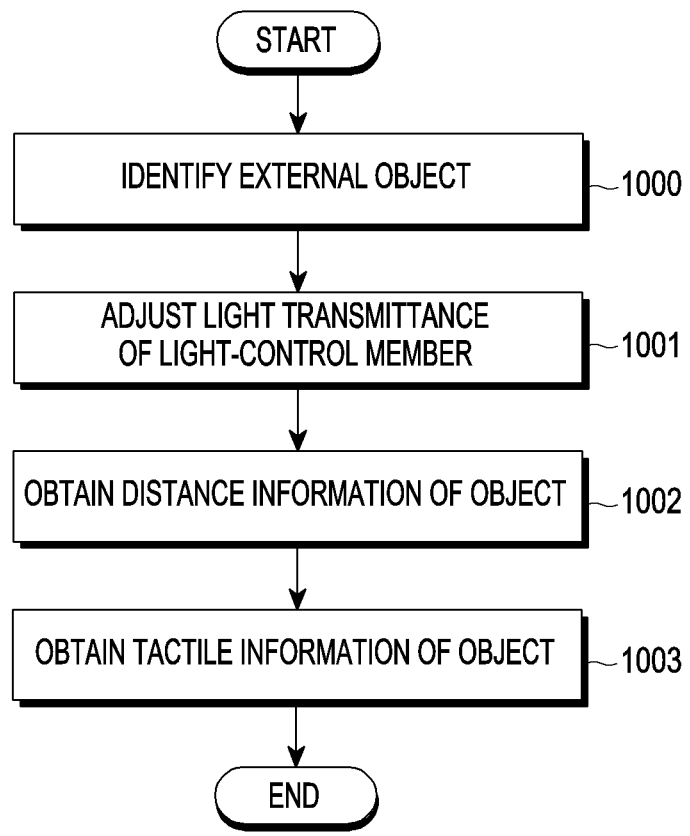
FIG. 6 is a flowchart illustrating a method for controlling a sensor assembly according to an embodiment of the disclosure.

FIG. 6 is a flowchart illustrating a method for controlling a sensor assembly according to an embodiment of the disclosure.

Figure 7A:
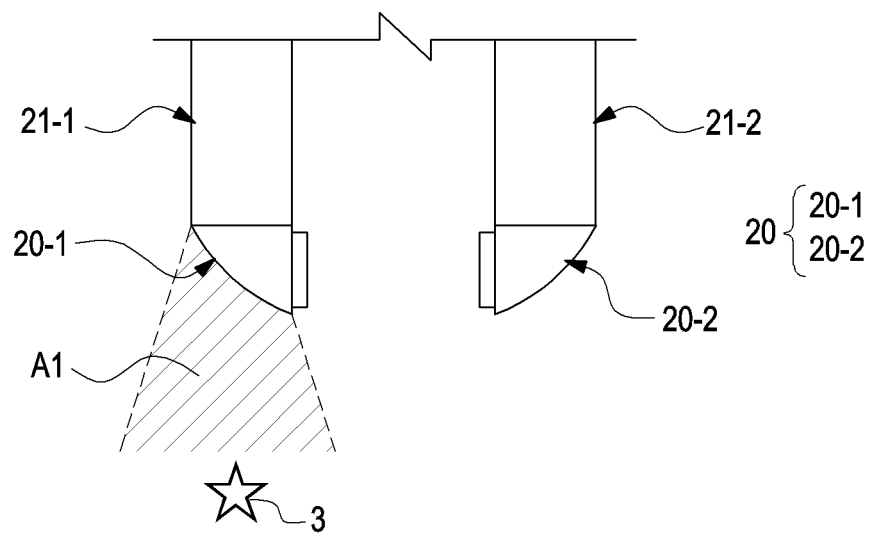
FIGS. 7A, 7B, and 7C are views illustrating a flowchart of FIG. 6 according to an embodiment of the disclosure.
Figure 7B:
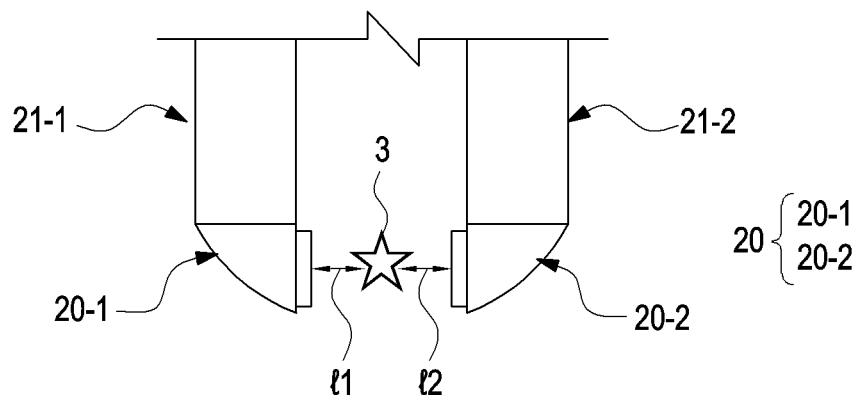
Figure 7C:
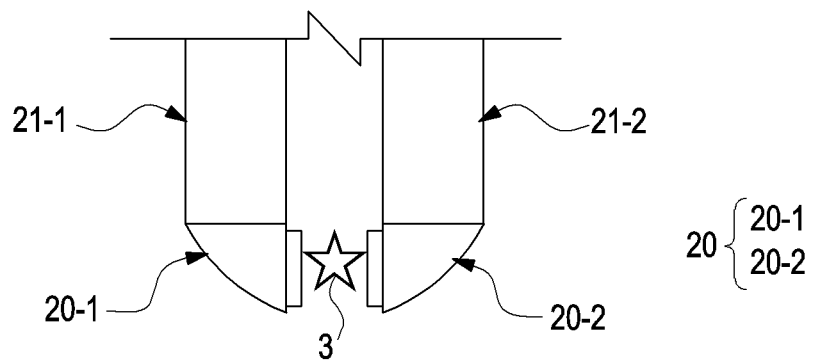

FIGS. 7A, 7B, and 7C are views illustrating an example of the flowchart of FIG. 6 according to an embodiment of the disclosure.

Referring to FIGS. 6 and 7A to 7C, the control method of the sensor assembly 20 may include all or a portion of an operation 1000 of identifying an external object, an operation 1001 of adjusting light transmittance of a light-control member, an operation 1002 of obtaining information of a distance to the object, and/or an operation 1003 of obtaining tactile information of the object.

According to an embodiment, the sensor assembly 20 may include a first sensor assembly 20-1 and a second sensor assembly 20-2. The first sensor assembly 20-1 and the second sensor assembly 20-2 may be respectively connected to a connection member 21-1, 21-2 through an external electronic device. According to an embodiment, the external electronic device connected to two or more sensor assemblies 20-1, 20-2 may be operated to grab an object 3. It is to be noted in advance that in describing embodiments hereinafter, the first sensor assembly 20-1 and the second sensor assembly 20-2 may include the same configuration, and a description for the first sensor assembly 20-1 may be applied to the second assembly 20-2, unless otherwise specified. According to an embodiment, the external electronic device may be an industrial robot and the connection member 21-1, 21-2 may correspond to a finger (or a configuration corresponding thereto) of the industrial robot.

According to various embodiments (referring to FIGS. 6 and 7A), the sensor assembly 20 may identify the object 3 outside the sensor assembly 20 (1000). The description with reference to FIG. 4 may be applied to the operation of identifying the external object 3 by the sensor assembly 20 and thus an overlapping description may be omitted.

According to an embodiment, the external electronic device may recognize the existence of the object 3 or obtain visual information about the object 3 through the sensor assembly 20. According to an embodiment, the operation of identifying the object 1 may be performed by at least one of the first sensor assembly 20-1 and/or the second sensor assembly 20-2. According to an embodiment, at least one of the first sensor assembly 20-1 and/or the second sensor assembly 20-2 by which the operation of identifying the object 1 is performed may control a light-control member (e.g., the light-control member 200 in FIG. 4) to have a light transmission state. For example, the first sensor assembly 20-1 may recognize the object 3 existing in a detection area A1. The detection area A1 may correspond to the first view-angle range (e.g., the first view-angle range R1 in FIG. 4) described above. According to an embodiment, when the object 3 is recognized, the sensor assembly 20 may be moved to be adjacent to the object 3 by the external electronic device. For example, the sensor assembly 20 may be moved to be adjacent to the object 3 such that light reflected by the object 3 is transmitted to the inside of the sensor assembly 20 through a contact member (e.g., the contact member 300 in FIG. 5) or an opening (e.g., the opening 104 in FIG. 5). For another example, the sensor assembly 20 may be moved to be brought into contact with the object 1 or to grab the object 3 such that the object 3 is positioned between the first sensor assembly 20-1 and/or the second sensor assembly 20-2.

According to various embodiments (referring to FIGS. 6 and 7B), the sensor assembly 20 may adjust light transmittance of a light-control member (e.g., the light-control member 200 in FIG. 5) (1001). According to an embodiment, when the object 3 is identified, the sensor assembly 20 may convert the light-control member (e.g., the light-control member 200 in FIG. 5) to be in a light reflection state. As described above, the light-control member (e.g., the light-control member 200 in FIG. 5) is converted to be in the light reflection state so that the sensor assembly 20 may obtain distance information to the object 3 (1002). According to an embodiment, the first sensor assembly 20-1 and/or the second sensor assembly 20-2 may obtain image information for determining a distance 11 and/or 12 to the object 3. The operation for determining distance information of the object 3 by the sensor assembly 20 may be the same as or similar to the description with reference to FIG. 5, and thus an overlapping description may be omitted.

According to various embodiments (referring to FIGS. 6 and 7C), the sensor assembly 20 may obtain tactile information of the object 3 (1003). The description with reference to FIG. 5 may be entirely or partially applied to the operation of obtaining the tactile information of the object 3 by the sensor assembly 20, and thus an overlapping description may be omitted.

According to an embodiment, the sensor assembly 20 may be moved to be brought into contact with the object 3 by the external electronic device (e.g., an industrial robot) connected thereto. For example, the first sensor assembly 20-1 and/or the second sensor assembly 20-2 may be moved by the external electronic device respectively connected thereto such that the contact member (e.g., the contact member 300 in FIG. 5) and the object 1 are brought into contact with each other. According to an embodiment, the external electronic device may grab the object 3 by using the sensor assembly 20. For example, the first sensor assembly 20-1 and the second sensor assembly 20-2 may be formed as a portion of the industrial robot, and the industrial robot may grab the object 3 by adjusting the positions of the first sensor assembly 20-1 and the second sensor assembly 20-2.

According to an embodiment, the first sensor assembly 20-1 and/or the second sensor assembly 20-2 may obtain surface tactile information of the object 3 from light reflected from the surface of the object 3 in a state of being in contact with the object 1 or grabbing the object 3.

When various pieces of information of an object are to be acquired in a single electronic device, various sensors are necessary, or a combination of multiple sensors need to be formed. This may cause a problem in that the relation of disposition between sensors is complicated, or the combined sensors have increased sizes.

Aspects of the disclosure are to address at least the above-mentioned problems and/or disadvantages and to provide at least the advantages described below. Accordingly, an aspect of the disclosure is to provide a sensor assembly including a light-control member capable of adjusting optical transmittance such that various pieces of information can be acquired with a single sensor assembly.

Additional aspects will be set forth in part in the description which follows and, in part, will be apparent from the description, or may be learned by practice of the presented embodiments.

According to various embodiments of the disclosure, a sensor assembly which has a simple structure, and which is compact, can be provided by providing a sensor assembly capable of acquiring various pieces of information of an external object according to optical transmittance of a light-control member.

Other aspects, advantages, and salient features of the disclosure will become apparent to those skilled in the art from the following detailed description, which, taken in conjunction with the annexed drawings, discloses various embodiments of the disclosure.

According to various embodiments, there may be provided a sensor assembly including: a housing (e.g., the housing 100 in FIG. 1) including an opening (e.g., the opening 104 in FIG. 3), a circuit substrate disposed in the inside of the housing, an image sensor (e.g., the image sensor 120 in FIG. 3) electrically connected to the circuit substrate, a light-control member (e.g., the light-control member 200 in FIG. 3) configured to change light transmittance from a light transmission state in which external light may be transmitted to a light reflection state in which light may be reflected according to application of power, and a contact member (e.g., the contact member 300 in FIG. 3) disposed adjacent to the opening such that light may pass therethrough, wherein, when viewed from a lateral side, the light-control member is disposed such that a longitudinal extension line of the light-control member and a longitudinal extension line of the contact member may form a predetermined angle therebetween, when the light-control member is in the light transmission state, the image sensor is disposed to obtain an image over the light-control member, and when the light-control member is in the light reflection state, the image sensor is disposed to receive light reflected by the light-control member and light directly incident through the contact member.

According to an embodiment, there may be provided the sensor assembly in which the image sensor includes a first view-angle range (e.g., the first view-angle range r1 in FIG. 3) for receiving light incident from the light-control member and a second view-angle range (e.g., the second view-angle range r2 in FIG. 3) for receiving light incident from the opening or the contact member.

According to an embodiment, there may be provided the sensor assembly in which the first view-angle range is configured to be wider than the second view-angle range.

According to an embodiment, there may be provided the sensor assembly in which when the light-control member is in the light reflection state, the image sensor may be operated as a stereo camera.

According to an embodiment, there may be provided the sensor assembly in which the image sensor may obtain information on a distance from the sensor assembly to an external object disposed adjacent to the opening.

According to an embodiment, there may be provided the sensor assembly which may obtain surface tactile information of the external object in contact with the contact member.

According to an embodiment, there may be provided the sensor assembly in which the contact member further includes a pattern formed in the inside or on a surface thereof to obtain the surface tactile information.

According to an embodiment, there may be provided the sensor assembly which further includes a light source disposed adjacent to the contact member.

According to an embodiment, there may be provided the sensor assembly in which the light source is configured to be operated when the light-control member is in the light reflection state and transfer white light to the inside of the contact member.

According to an embodiment, there may be provided the sensor assembly which may recognize the external object disposed on the rear side of the light-control member when the light-control member is in the light transmission state.

According to an embodiment, there may be provided the sensor assembly which further includes a connector part (e.g., the connector part 11 in FIG. 1) to be connected to an external electronic device.

According to an embodiment, there may be provided the sensor assembly in which the external electronic device is an industrial robot.

According to various embodiments, there may be provided a method for controlling a sensor assembly, the method including an operation of preparing a sensor assembly (e.g., the sensor assembly 10 in FIG. 1) including a housing (e.g., the housing 100 in FIG. 1) including an opening (e.g., the opening 104 in FIG. 1), a circuit substrate disposed in the inside of the housing, an image sensor (e.g., the image sensor 120 in FIG. 3) electrically connected to the circuit substrate, a light-control member (e.g., the light-control member 200 in FIG. 3) configured to be changed from a light transmission state in which external light may be transmitted to a light reflection state in which light may be reflected according to application of power, and a contact member (e.g., the contact member 300 in FIG. 3) disposed adjacent to the opening such that light may pass therethrough, the light-control member being disposed, when viewed from a lateral side, such that a longitudinal extension line of the light-control member and a longitudinal extension line of the contact member may form a predetermined angle therebetween, an operation of adjusting the light-control member to be in the light transmission state, an operation of identifying an external object existing over the light-control member, an operation of adjusting the light-control member to be in the light reflection state, an operation of obtaining information on a distance between the external object and the sensor assembly, and an operation of obtaining surface tactile information of the external object.

According to an embodiment, there may be provided the method for controlling a sensor assembly in which the image sensor includes a first view-angle range (e.g., the first view-angle range r1 in FIG. 3) for receiving light incident from the light-control member and a second view-angle range (e.g., the second view-angle range r2 in FIG. 3) for receiving light incident from the opening or the contact member.

According to an embodiment, there may be provided the method for controlling a sensor assembly in which the first view-angle range is configured to be wider than the second view-angle range.

According to an embodiment, there may be provided the method for controlling a sensor assembly in which when the light-control member is in the light reflection state, the image sensor may be operated as a stereo camera.

According to an embodiment, there may be provided the method for controlling a sensor assembly in which the contact member further includes a pattern formed in the inside or on a surface thereof to obtain the surface tactile information.

According to an embodiment, there may be provided the method for controlling a sensor assembly in which the sensor assembly further includes a connector part (e.g., the connector part 11 in FIG. 1) to be connected to an external electronic device.

According to an embodiment, there may be provided the method for controlling a sensor assembly in which the external electronic device is an industrial robot.

According to various embodiments, there may be provided an electronic device including: a sensor assembly (the sensor assembly 10 in FIG. 1), and a circuit board electrically connected to the sensor assembly, the sensor assembly including: a housing (e.g., the housing 100 in FIG. 3) including an opening (e.g., the opening 104 in FIG. 3), an image sensor (e.g., the image sensor 120 in FIG. 3), a light-control member (e.g., the light-control member 200 in FIG. 3) configured to change light transmittance from a light transmission state in which external light may be transmitted to a light reflection state in which light may be reflected according to application of power, and a contact member (e.g., the contact member 300 in FIG. 3) disposed adjacent to the opening such that light may pass therethrough, wherein, when viewed from a lateral side, the light-control member is disposed such that a longitudinal extension line of the light-control member and a longitudinal extension line of the contact member may form a predetermined angle therebetween, when the light-control member is in the light transmission state, the image sensor is disposed to obtain an image over the light-control member, and when the light-control member is in the light reflection state, the image sensor is disposed to receive light reflected by the light-control member and light directly incident through the contact member.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. A sensor assembly comprising:
a housing comprising an opening;
a circuit board disposed in the housing;
an image sensor electrically connected to the circuit board;
a light-control member configured to change light transmittance from a light transmission state capable of transmitting external light to a light reflection state capable of reflecting light according to application of power; and
a contact member disposed adjacent to the opening and allowing light to pass therethrough,
wherein, when viewed from a lateral side, the light-control member is disposed such that a longitudinal extension line of the light-control member and a longitudinal extension line of the contact member form a predetermined angle therebetween,
wherein, when the light-control member is in the light transmission state, the image sensor is disposed to obtain an image over the light-control member, and
wherein, when the light-control member is in the light reflection state, the image sensor is disposed to receive light reflected by the light-control member and light directly incident through the contact member.

2. The sensor assembly of claim 1, wherein the image sensor comprises:
a first view-angle range for receiving light incident from the light-control member; and
a second view-angle range for receiving light incident from the opening or the contact member.

3. The sensor assembly of claim 2, wherein the first view-angle range is set to be wider than the second view-angle range.

4. The sensor assembly of claim 2, wherein in case that the light-control member is in the light reflection state, the image sensor is operatable as a stereo camera.

5. The sensor assembly of claim 4, wherein the image sensor obtains information on a distance from the sensor assembly to an external object disposed adjacent to the opening.

6. The sensor assembly of claim 5, wherein the sensor assembly is capable of obtaining surface tactile information of the external object in contact with the contact member.

7. The sensor assembly of claim 6, wherein the contact member further comprises a pattern formed in an inside or on a surface thereof to obtain the surface tactile information.

8. The sensor assembly of claim 7, further comprising: a light source disposed adjacent to the contact member.

9. The sensor assembly of claim 8, wherein the light source is configured to be operated when the light-control member is in the light reflection state and transfer white light to the inside of the contact member.

10. The sensor assembly of claim 1, wherein in case that the light-control member is in the light transmission state, the sensor assembly is capable to recognize an external object disposed on a rear side of the light-control member.

11. The sensor assembly of claim 1, further comprising:
a connector part to be connected to an external electronic device.

12. The sensor assembly of claim 11, wherein the external electronic device is an industrial robot.

13. A method for controlling a sensor assembly, the method comprising:
preparing a sensor assembly comprising:
a housing comprising:
an opening, a circuit substrate disposed inside the housing,
an image sensor electrically connected to the circuit substrate,
a light-control member configured to be changed from a light transmission state capable of transmitting external light to a light reflection state capable of reflecting light according to application of power, and
a contact member disposed adjacent to the opening and allowing light to pass therethrough, the light-control member being disposed, when viewed from a lateral side, such that a longitudinal extension line of the light-control member and a longitudinal extension line of the contact member form a predetermined angle therebetween;
adjusting the light-control member to be in the light transmission state;
identifying an external object existing over the light-control member;
adjusting the light-control member to be in the light reflection state;
obtaining information on a distance between the external object and the sensor assembly; and
obtaining surface tactile information of the external object.

14. The method of claim 13, wherein the image sensor comprises:
a first view-angle range for receiving light incident from the light-control member; and
a second view-angle range for receiving light incident from the opening or the contact member.

15. The method of claim 14, wherein the first view-angle range is configured to be wider than the second view-angle range.

16. The method of claim 14, wherein in case that the light-control member is in the light reflection state, the image sensor is operatable as a stereo camera.

17. The method of claim 13, wherein the contact member further comprises a pattern formed in the inside or on a surface thereof to obtain the surface tactile information.

18. The method of claim 13, wherein the sensor assembly further comprises a connector part to be connected to an external electronic device.

19. The method of claim 18, wherein the external electronic device is an industrial robot.

20. An electronic device comprising:
a sensor assembly; and
a circuit board electrically connected to the sensor assembly,
wherein the sensor assembly comprises:
a housing comprising an opening,
an image sensor,
a light-control member configured to change light transmittance from a light transmission state capable of transmitting external light to a light reflection state capable of reflecting light according to application of power, and
a contact member disposed adjacent to the opening and allowing light to pass therethrough,
wherein, when viewed from a lateral side, the light-control member is disposed such that a longitudinal extension line of the light-control member and a longitudinal extension line of the contact member form a predetermined angle therebetween,
wherein, when the light-control member is in the light transmission state, the image sensor is disposed to obtain an image over the light-control member, and
wherein, when the light-control member is in the light reflection state, the image sensor is disposed to receive light reflected by the light-control member and light directly incident through the contact member.

* * * * *